United States Patent Office.

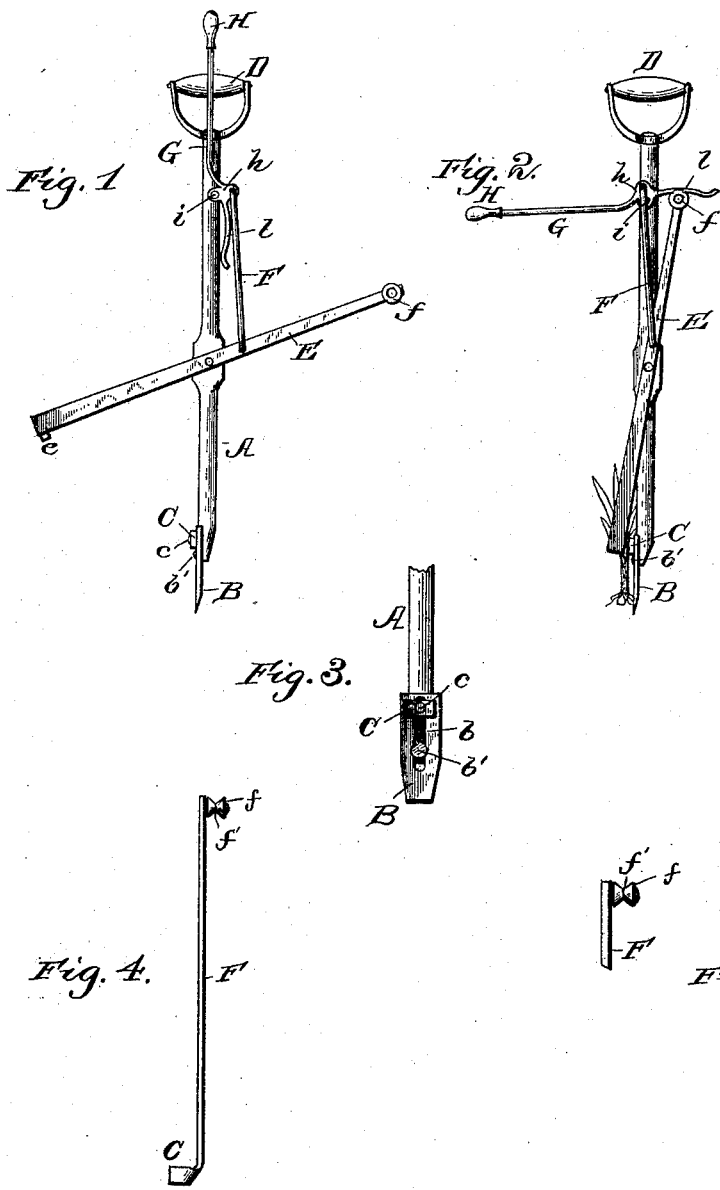

JOHN LEWIS TANDY, OF COLUMBIA, MISSOURI.

CORN-THINNER.

SPECIFICATION forming part of Letters Patent No. 473,678, dated April 26, 1892.

Application filed September 22, 1891. Serial No. 406,460. (No model.)

*To all whom it may concern:*

Be it known that I, JOHN LEWIS TANDY, a citizen of the United States, and a resident of Columbia, in the county of Boone and State of Missouri, have invented certain new and useful Improvements in Corn-Thinners; and I do hereby declare the following to be a full, clear, and exact description of the invention, such as will enable others skilled in the art to which it appertains to make and use the same.

My invention relates to improvements in implements for thinning growing corn; and the object of the invention is to provide a simple implement which can be used to remove one or more stalks from a hill of corn with ease to the operator and without damaging the remaining stalks.

With this end in view my invention consists in the combination, with a suitable staff having a cutting-blade adjustably connected thereto, of an auxiliary arm pivotally connected to the staff, an operating-lever fulcrumed on the staff and connected with the auxiliary arm, and a swiveled hand-rest secured on the upper end of the staff.

My invention further consists in the peculiar construction and arrangement of parts, as will be hereinafter more fully pointed out and claimed.

I have illustrated my improvement in the accompanying drawings, in which—

Figure 1 is a side elevation of an implement constructed in accordance with my invention, showing the parts in their opened positions. Fig. 2 is a similar view showing the parts in position to remove the stalk. Fig. 3 is an enlarged detail view of the lower end of the staff and the cutting-blade. Fig. 4 is a detail view of a modified form of the auxiliary arm, and Fig. 5 is another detail view.

Like letters of reference denote corresponding parts in the several figures of the drawing, referring to which—

A designates the staff of the device, which has a cutting-blade B attached at its lower end. The blade B is provided with a central longitudinal slot $b$, through which fastening bolts or pins $b'$ $c$ are passed, so that the blade can be moved longitudinally on the staff A; but it is obvious that other means can be adapted to permit of the adjustment of this blade, if desired. An elastic pad or cushion C is attached to the staff A by a suitable pin or bolt $c$, which passes through the slot $b$ in the blade B, and on the upper end of the staff is loosely fitted, so as to turn freely thereon, a hand-rest D. An auxiliary arm E is pivotally connected at an intermediate point of its length to the staff A, and to the lower end thereof is attached an elastic pad or cushion $e$, while a small roller $f$ is preferably mounted near the upper end of said arm. A rod F connects the auxiliary arm E with an operating-lever G, which is fulcrumed on the staff A between the pivot-point of the arm E and the swiveled head or hand rest D. The roller $f$ is preferably provided with a peripheral groove $f'$.

The lever G is provided with a handle H and at an intermediate point of its length with a plate $h$, through which the pivot-pin $i$ of the lever extends and to which the upper end of the connecting-rod F is attached. The lever G is curved, as at $l$, and when it is raised to force the lower end of the arm E toward the staff A this curved portion contacts with the roller $f$ and applies power to the arm E.

The operation of my invention is as follows: The blade B is forced into the ground to sever the roots of the stalk or stalks it is desired to remove from the hill. The handle H is raised, which forces the lower end of the arm E toward the staff A, whereby the stalk or stalks are grasped between the elastic pads or cushions C $e$ and easily withdrawn from the ground without damaging the other stalks in the hill. When in raising the handle H the connecting-rod F comes nearly into a vertical plane and practically ceases to exert any upward pull on the arm E, the roller $f$ at the upper end of such arm contacts with the bent portion of the lever G and the arm E is forced closely against the cushion C on the staff A. When lowering the handle H to force the arm E away from the staff A, the roller $f$ rides easily under the curved portion of the lever G. It will be noticed that the rod F is united to the lever G and auxiliary arm E near their pivot or fulcrum points, and thus I obtain the necessary power and also force the lower end of the auxiliary arm so far from the staff A that the thinning operations can be carried on rapidly. The curved portion of the lever G fits in the peripheral groove $f'$ in the auxiliary arm E, and is therefore not liable to be sprung out of place by the operating-lever.

In Fig. 4 I have illustrated a modified form of the auxiliary arm in which the lower end of the arm is bent so that the flat face thereof contacts with the cushion C when the lower end of the arm E is forced toward the staff A.

The head or hand rest D can be turned on the staff A, so that the implement can be used by either a right or left handed person and a stalk on either side of a hill of corn conveniently removed. The operator standing in one position and holding the handle with one hand can turn the staff around into position to pull any desired stalk. By making the blade B adjustable on the staff A the device can be used equally well for deep or shallow planting.

I am aware that changes in the form and proportion of parts and details of construction of the devices herein shown and described as an embodiment of my invention can be made without departing from the spirit or sacrificing the advantages thereof, and I therefore reserve the right to make such changes and alterations as fairly fall within the scope of my invention.

Having thus fully described my invention, what I claim as new, and desire to secure by Letters Patent, is—

1. An implement consisting of a staff, a longitudinally-slotted cutting-blade attached to the staff by bolts which pass through the slot therein and the staff, a pad or cushion carried by the staff and having its attaching-bolt extending through the slot in the cutting-blade, an auxiliary arm pivotally connected to the staff above the cutting-blade and having one end bent to extend across the face of the cutting-blade, an operating-lever fulcrumed on the staff, and a rod connecting said lever with the auxiliary arm, substantially as described.

2. The combination of a staff, a cutting-blade carried by the staff, an auxiliary arm pivoted on the staff and having a friction-roller near one end, an operating-lever fulcrumed on the staff and provided with a curved portion which extends over the friction-roller on the auxiliary arm, and a rod connecting the auxiliary arm with the operating-arm, substantially as shown and described, for the purpose specified.

3. In an implement for thinning corn, the combination, with cutting and pulling mechanism, of the swiveled hand-rest, substantially as shown and described.

In testimony whereof I affix my signature in presence of two witnesses.

JNO. LEWIS TANDY.

Witnesses:
D. R. VIVION,
J. P. KENNARD.